July 28, 1953     J. E. HAWKINS ET AL     2,647,207
RECTIFIER BALANCING CIRCUIT
Filed June 27, 1950                    2 Sheets-Sheet 1

INVENTORS:
James E. Hawkins
Robert S. Finn
BY Mason, Kolehmainen, Rathburn & Wyss
ATT'YS INVENTORS
James E. Hawkins
Robert S. Finn
BY
Mason, Kolehmainen, Rathburn & Wyss
Att'ys

Patented July 28, 1953

2,647,207

UNITED STATES PATENT OFFICE 2,647,207

RECTIFIER BALANCING CIRCUIT

James E. Hawkins and Robert S. Finn, Tulsa, Okla., assignors to Seismograph Service Corporation, Tulsa, Okla., a corporation of Delaware Application June 27, 1950, Serial No. 170,670

3 Claims. (Cl. 250—27)

The present invention relates to electrical balancing circuits and, more particularly, to circuits for balancing the signal output of a rectifier circuit adapted normally to provide equal voltages of opposite polarity across a pair of load impedances.

In many instances, a pair of opposed rectifying devices are employed to rectify or detect an input signal, which may, for example, comprise an angle modulated wave or a pair of input signals of different phase relationship, and to provide across a pair of load impedances of equal value rectified or detected output voltages which are equal in amplitude and of opposite polarity. A rectifier circuit of this type, may, for example, be employed as a phase discriminator of the form disclosed in co-pending application, Serial No. 100,382, to James E. Hawkins and Beverly W. Koeppel, filed on June 21, 1949, now Patent No. 2,551,211, granted May 1, 1951, and assigned to the same assignee as the present invention. In a phase discriminator of this character the discriminator output is zero when the input voltages have a predetermined phase relationship and the output voltage varies in polarity and amplitude in accordance with variations in the phase of the input voltages. When the input signals are of the type derived from a radio position indicating system, such as is described in the above-identified application, the condition of equal input voltages is met when the input voltages are separated in phase by 90 degrees, which condition may be called the zero signal output of the discriminator. Such a condition also obtains in frequency modulated wave discriminators wherein tuned circuits are utilized to provide a pair of input voltages which vary in phase in accordance with a modulation signal. Here also the input voltages applied to the rectifiers are equal when they are 90 degrees apart, a condition which corresponds to an unmodulated carrier wave.

A pair of opposed rectifiers may also be employed in an AVC system of the type described in a co-pending application, Serial No. 673,744, of James E. Hawkins and Jesse R. Cornett, which was filed on June 1, 1946, now Patent No. 2,554,-905, granted May 29, 1951, and is assigned to the same assignee as the present invention. In such an AVC system, a pair of series connected rectifiers are utilized to provide an output voltage across a common load impedance of equal value and it is desirable to equalize the currents flowing through the rectifiers over a wide range of input voltages.

In all of the above-described circuits, the use of opposed rectifier tubes having dissimilar tube characteristics produces an asymmetry in the output voltages of the rectifiers, which, in turn, introduces errors into subsequent measurements and leads to unsatisfactory operation. Accordingly, it is an important object of the present invention to provide a new and improved rectifier balancing circuit in which symmetrical output voltages are produced at zero signal level despite substantial variations in tube characteristics of the rectifiers employed.

It is another object of the present invention to provide a new and improved rectifier balancing circuit in which equal voltages of opposite polarity may be produced in response to equal input voltages applied thereto regardless of variations in the characteristics of rectifier tubes employed.

It is still another object of the present invention to provide a new and improved rectifier balancing circuit in which the characteristics of the rectifier tubes may be equalized so as to provide equal current flow therethrough in response to input voltages having a wide range of amplitudes or phase relationships.

The invention, both as to its organization and method of operation, together with further objects and advantages thereof, will best be understood by reference to the following specification taken in connection with the accompanying drawings, in which.

In brief, the rectifier balancing circuit of the present invention contemplates the employment of a pair of rectifier tubes in an opposed rectifier circuit, such as a phase discriminator circuit, which circuit is adapted to provide zero output voltage in response to input signals supplied thereto which differ in phase by 90 degrees. By way of example, the phase discriminator circuit may be controlled by input signals which are received from two transmitter stations of a radio position indicating system of the continuous wave type such as is described in the co-pending application, Serial No. 100,382, the output of the phase discriminator being supplied to a phase indicator through a motor drive network which continuously adjusts the position of the indicator so that the output from the phase discriminator is equal to zero. In such a system the output voltages from the opposed rectifiers of the discriminator circuit must be symmetrical in order that the zero signal level corresponds with the desired phase relationship of the input signals. In accordance with the present invention means are provided for achieving such symmetry of the output voltages of the opposed halves of the discriminator circuit although the characteristics of the tubes employed in the circuit may be widely different. With this arrangement any given set of rectifiers may be adjusted so as to provide symmetrical output voltages at zero signal; and, further, the rectifiers may be replaced and the symmetry maintained by means of a simple adjustment of the equipment.

While the rectifier balancing circuit of the present invention is particularly well adapted for use in connection with a radio position indicating system, wherein the zero signal output level of a balanced rectifier circuit is particularly important, it will be understood that the rectifier balancing circuit of the present invention has numerous other applications and may be employed whenever it is desired to provide symmetrical output voltages from a pair of opposed rectifiers in response to input signals of a given relationship.

Figure 1:
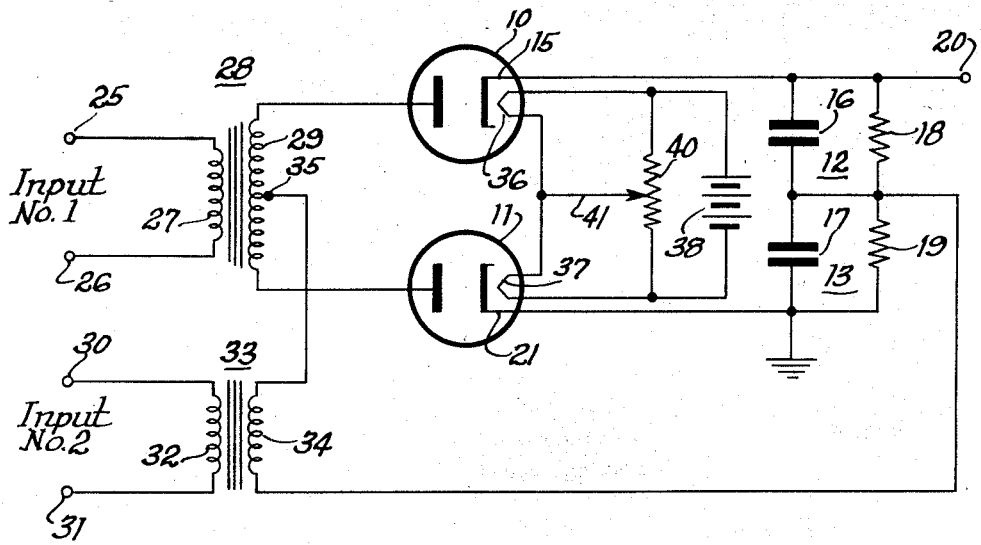
Fig. 1 is a schematic diagram of a rectifier balancing circuit embodying the principles of the present invention.

Referring now to the embodiment of the invention illustrated in Fig. 1 of the drawings, a phase discriminator circuit is there shown embodying the principles of the present invention. As shown, the phase discriminator circuit comprises a pair of electron discharge devices 10 and 11 of the diode rectifier type, which provide rectified output voltages across a pair of load circuits indicated generally at 12 and 13. Specifically, the cathode 15 of the device 10 is connected through a first capacitor 16 and a second capacitor 17 to ground, and also through a first resistor 18 and a second resistor 19 to ground. The junction points between the capacitors 16 and 17 and the resistors 18 and 19 are connected together and the cathode 15 is further connected to an output terminal 20. The cathode 21 of the device 11 is connected to ground. A first input signal, which may be supplied from one channel of the mobile receiving unit of a radio position indicating system, such as is described in detail in the copending application Serial No. 100,382, is applied to the input terminals 25 and 26 and by way of these terminals to the primary winding 27 of a center tapped input transformer 28. The outer ends of the secondary winding 29 of the transformer 28 are connected to the anodes of the rectifier devices 10 and 11. A second input signal, which may be supplied from the other channel of the mobile receiving unit of the radio position indicating system referred to above is applied to the input terminals 30 and 31 and thence to the primary winding 32 of a second input transformer 33. One end of the secondary winding 34 of the transformer 33 is connected to the center tap 35 of the transformer 28. The other end of the secondary winding 34 is connected to the junction point between the load circuits 12 and 13. The filament 36 of the device 10 is connected in series with the filament 37 of the device 11 and the series connected filaments 36 and 37 are connected across a suitable source of filament voltage illustrated in Fig. 1 as the battery 38.

In order to adjust the cathode emissions of the devices 10 and 11 to the end that the voltages produced across the load circuits 12 and 13 may be equalized at the zero voltage level, a potentiometer 40 is provided which is connected across the filaments 36 and 37 and includes a movable arm 41 connected to the junction point between the filaments 36 and 37.

Briefly to consider the operation of the above-described rectifier balancing circuit, it will be evident from an analysis of the circuit elements described above that the secondary windings 29 and 34 are so interconnected as to supply both of the signal input voltages to each rectifier circuit. Thus, the upper half of the secondary winding 29 is connected in series with the secondary winding 34 so as to supply both input signals to the rectifier 10 and its associated load circuit 12. Likewise, the lower half of the secondary winding 29 is connected in series with the secondary winding 34 so as to supply both input signals, with the polarity of the input signal supplied by the transformer 28 reversed, to the other detector circuit and its associated load circuit 13. When the two input voltages possess a 90-degree phase relationship, the rectifier devices 10 and 11 theoretically supply equal voltages of opposite polarity to the load circuits 12 and 13 so zero voltage appears at the output terminal 20. However, if the rectifying tubes 10 and 11 do not have similar characteristics the currents drawn by these tubes with equal input voltages applied thereto will be dissimilar and hence will produce asymmetric voltages across the load circuits 12 and 13 and a consequent output voltage at the terminal 20 having an amplitude and polarity which is determined by the dissimilarity of the tube characteristics.

In accordance with the present invention, the filament voltage supplied to the devices 10 and 11 from the potential source 38 may be varied so as to provide equal thermionic emissions of the tubes 10 and 11 so as to cause equal currents to flow through these tubes at the zero potential level. More particularly, the arm 41 of the potentiometer 40 may be so adjusted as to provide equal output voltages across the detector load circuits 12 and 13 although the tube characteristics with rated filament voltage applied thereto may be markedly dissimilar. Thus, as the arm 41 is moved upwardly the shunting effect of the portion of the potentiometer 40 which is connected across the filament 36 is increased and the filament voltage applied to the filament 36 is correspondingly decreased so as to decrease the cathode emission of the tube 10. At the same time, the shunting effect of the potentiometer 40 on the filament 37 is reduced and the cathode emission of the tube 11 is correspondingly increased. The converse action occurs as the arm 41 is moved downwardly. There is thus provided a balanced voltage adjusting means which may be utilized to vary the filament voltages of the tubes 10 and 11 in opposite senses so as to provide symmetrical output voltages at the desired zero signal level.

Figure 2:
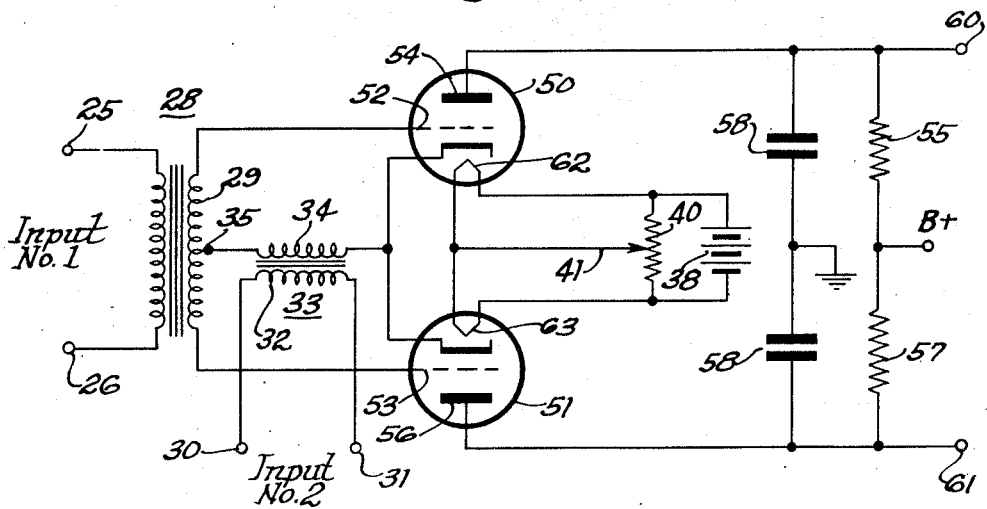
Fig. 2 is a schematic diagram of an alternative embodiment of the invention.

The rectifier balancing circuit of the present invention may be employed in other types of phase discriminator circuits. Thus, for example, the rectifier balancing circuit of the present invention may be employed in the triode type phase discriminator circuit shown in detail in Fig. 2. In many respects, the phase discriminator of Fig. 2 is identical to the phase discriminator of Fig. 1 and those components thereof which perform the same function have been identified by the same reference numerals. As shown, signal input voltages produced across the secondary windings 29 and 34 are series connected to the input circuits of a pair of opposed triode type electron discharge tubes 50 and 51. Thus, the cathodes of the devices 50 and 51 are connected together and connected to one end of the secondary winding 34. The other end of the secondary winding 34 is connected to the center tap 35 and the outer ends of the secondary winding 39 are connected to the respective control electrodes 52 and 53 of the devices 50 and 51. The anode 54 of the tube 50 is connected through an anode load impedance 55 to the unidirectional source of positive potential indicated by the reference character B+. Likewise, the anode 56 of the tube 51 is connected through an anode load impedance 57 to the B+ supply source. Filter capacitors 58 and 59 are respectively connected from the anodes 54 and 56 to ground. A balanced output voltage from the discriminator is provided at the output terminals 60 and 61. The filaments 62 and 63 of the tubes 50 and 51 are connected in series and are connected to the suitable source of potential 38 in a manner entirely similar to that shown in Fig. 1. Likewise, the variable potentiometer 40 is provided having the movable arm 41 which may be adjusted to provide equal voltages across the opposed load resistors 55 and 57.

In considering the operation of the alternative embodiment of Fig. 2, it will be seen that the signal input voltages are combined in the input circuits of the tubes 50 and 51 and due to plate rectification, voltages are produced across the output load impedances 55 and 57 which are equal to the vector sum of the input voltages. By adjustment of the arm 41 the cathode emissions of the devices 50 and 51 may be equalized so that the currents flowing through the load resistors 55 and 57 are of the same magnitude and a true zero output voltage is produced at the terminals 60 and 61.

Figure 3:
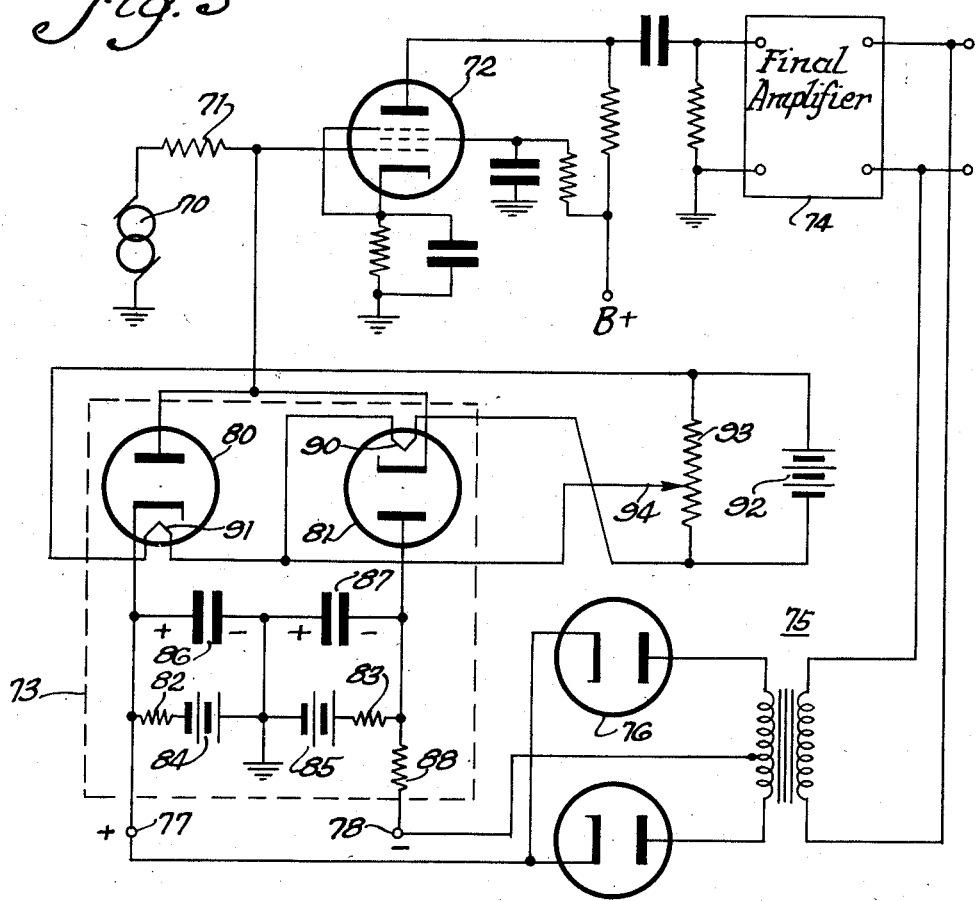
Fig. 3 is a schematic diagram of a further embodiment of the present invention.

A further alternative embodiment of an opposed rectifier circuit wherein the balancing circuit of the present invention may be employed is shown in Fig. 3. In the circuit of Fig. 3 there is shown an AVC system of the type disclosed in the copending application, Serial No. 673,744, referred to above. While reference may be had to this co-pending application for a detailed description of the operation of an AVC system of this type, for the purposes of the present disclosure it may be stated that input signals which are supplied from a signal source indicated by the generator 70 are impressed upon the control electrode of an amplifying device 72 through a series resistor 71. The control electrode of the device 72 is further connected through a variable impedance network indicated generally at 73 to ground. The variable impedance network 73 produces a variable shunting effect upon the input circuit of the variable gain device 72 and accordingly provides a varying input voltage therefor. An output voltage derived from the anode of the device 72 is supplied to a final amplifier 74, the output terminals of which are connected through a feedback transformer indicated generally at 75 and a full wave rectifier circuit 76 to the input terminals 77 and 78 of the variable impedance network 73.

The variable impedance network 73 comprises a pair of oppositely opposed diode rectifiers 80 and 81 connected in series with biasing circuits which include the resistors 82 and 83 and the biasing batteries 84 and 85. The resistor 82 and battery 84 is paralleled by a capacitor 86 and the resistor 83 and the battery 85 is paralleled by a capacitor 87. The time constants of the biasing circuits are determined by the resistor values of the resistors 82 and 83, the capacitance value of the condensers 86 and 87 and the resistance of a series resistor 88 through which a variable bias potential or control voltage is impressed across the circuit from the full wave rectifier 76, in the manner explained below. The diode rectifiers 80 and 81 have impedances which vary as a function of the magnitude of current flow therethrough and hence as a function of the bias voltages impressed thereacross. Regarding these rectifiers and their associated biasing circuit as a series network, it will be noted that the batteries 84—85 are so poled as normally to prevent current conduction through the space current paths of these rectifiers. Thus, normally the variable impedance network 73 presents a very high shunt impedance across the input circuit of the amplifier stage 72. By suitable choice of the voltages of the biasing batteries 84 and 85 any desired threshold may be established which must be exceeded by a biasing voltage of opposite polarity before space current flow through the rectifiers 80 and 81 may be started to lower the shunt impedance across the input circuit of the amplifier stage 72.

For the purpose of overcoming the bias voltages afforded by the batteries 84 and 85 to thus effect current flow through the rectifiers when the signal voltage appearing at the output side of the final amplifier 74 exceeds a predetermined amplitude, and thereafter varying the magnitude of current flow through the rectifiers as a direct function of the amplitude of the signal voltage developed at the output side of the amplifier stage 74, the full wave rectifier 76 is coupled to the output side of the amplifier 74 through the feedback transformer 75. The variable impedance network 73 represents a shunt load upon the full wave rectifier 76 and, as will be evident from the polarity signs applied to the output leads of the rectifier, the rectifier signal voltage appearing across these leads is applied to the biasing circuits of the variable impedance network in opposition to the bias voltages provided by the biasing batteries 84 and 85.

So long as the magnitude of the voltage from the rectifier 76 does not exceed the combined voltages of the batteries 84 and 85, the rectifiers 80 and 81 remain non-conductive to prevent any change in the shunt impedance across the movable circuit of the input circuit 72. However, when the voltage appearing across the terminals 77 and 78 exceeds the combined voltage of the batteries 84 and 85, a net voltage is impressed across the series connected rectifiers 80 and 81 with the proper polarity to effect current conduction therethrough. As a consequence, the internal impedances of the rectifiers decrease to produce a corresponding decrease in the impedance shunting the input circuit of the amplifier tube 72. The extent to which the impedances of the rectifiers 80 and 81 are decreased varies as a direct function of the magnitude of the current flow therethrough. Thus, during a rise in the signal amplitude, current conduction through the rectifiers 80 and 81 is progressively increased to effect a progressive decrease in the impedance of the network 73. Conversely during a period of decreasing signal amplitude current conduction through the rectifiers 80 and 81 is correspondingly decreased to effect a corresponding decrease in the impedance of the network 73. The effect of decreasing the impedance of the network 73 in the manner just expressed is that of decreasing the voltage appearing at the input circuit. In other words, the input electrodes of the amplifier tube 72 are robbed of a variable portion of the signal voltage supplied by the generator 70.

When the rectifiers conduct, which condition occurs when the control voltage supplied to the terminals 77 and 78 is sufficient to overcome the biasing voltage of batteries 84 and 85, an AVC action takes place. It will be seen that unless the cathode emissions of the rectifiers 80 and 81 are similar, the flow of current through the rectifiers will cause unequal voltage drops thereacross so that the input circuit is unbalanced and a voltage appears at the input electrode of the amplifying tube 72, thereby causing an undesirable surge of plate current which will appear in the output of the final amplifier 74. However, the rectifier balancing circuit of the present invention may be employed substantially to match the tube characteristics of the rectifiers 80 and 81 so that the potential at the control electrode of the tube 72 does not change upon conduction of the devices 80 and 81 and the network 73 operates solely as a variable impedance device without injecting an undesirable voltage pulse into the circuit. Thus, the filament 90 of the device 81 is connected in series with the filament 91 of the device 80 across the source of filament voltage 92. The balancing potentiometer 93 is connected across the filaments 90 and 91 and the movable arm 94 of the potentiometer 93 is connected to the common junction point of the filaments 90 and 91. With this arrangement, the voltages applied to the filaments 90 and 91 may be adjusted so that the characteristics of the rectifier tubes 80 and 81 are substantially matched, whereby current flow through the rectifiers 80 and 81 during AVC periods does not produce an objectionable voltage pulse at the input circuit of the amplifier 72.

Figure 4:
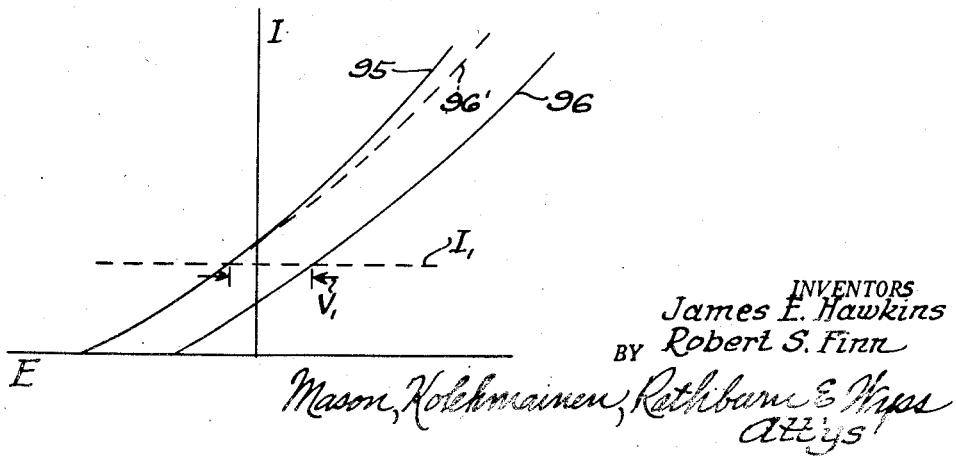
Fig. 4 illustrates graphically certain characteristics of the tubes embodied in the circuit of Fig. 3.

In considering the manner in which the characteristics of the rectifier tubes 80 and 81 are matched over a substantial portion thereof by means of the balancing circuit of the present invention, reference is now made to Fig. 4 wherein the characteristics of the tubes 80 and 81 and the manner in which these characteristics may be varied by adjustment of the potentiometer 93 are illustrated. In the graph of Fig. 4, voltage is plotted along the abcissa and current is plotted along the ordinate. The voltage-current characteristic of the tube 81 is shown at 95 and, from the foregoing discussion, it will be seen that the voltage-current characteristic of the tube 80 should coincide as closely as possible with the curve 95. However, the current voltage characteristic of the tube 80 may, in many instances be substantially different from the characteristic 95 and may appear as the curve 96. With the markedly dissimilar characteristics 95 and 96, it will be apparent that conduction of a given current through the tubes 80 and 81, such, for example, as the current $I_1$, causes a difference of voltage to be produced at the input circuit of the amplifier tube 72 as described in connection with Fig. 3. However, by moving the arm 94 of the potentiometer 93 in the proper direction to increase the filament voltage of the tube 80, the voltage-current characteristic of this tube may be shifted to coincide substantially with that of the tube 95 and to take the position shown at 96'. Thus, the voltage-current characteristics of the tubes are matched over a substantial range by adjustment of the filament voltages supplied to the two tubes 80 and 81. In this connection it will be evident that, as the arm 94 is moved in the direction to increase the current drawn by device 80, the current drawn by the device 81 will be correspondingly decreased. However, for illustrative purposes, the characteristic 95 has been shown as remaining fixed and the characteristic 96 has been shifted to coincide therewith.

In the embodiments of the invention shown in Figs. 1 and 3, the rectifier tubes may be contained in a single envelope in which case a double diode rectifier of the Sylvania commercial type 5679 may be employed. In a double diode rectifier of this type, the tube sections are provided with separate filaments which are connected in series and the junction point of the filaments is brought out to a separate terminal pin.

While there have been described what are at present considered to be the preferred embodiments of the invention, it will be understood that various modifications may be made therein which are within the true spirit and scope of the invention as defined in the appended claims.

What is claimed as new and is desired to be secured by Letters Patent of the United States is:

1. A rectifier balancing circuit, comprising a pair of opposed rectifiers each provided with a filament, a unidirectional potential source of filament potential, means connecting the filaments of said rectifiers in series across said source, a potentiometer connected across said series connected filaments and having a substantial shunting effect thereon, said potentiometer being provided with an adjustable arm, and means including a connection from the arm of said potentiometer to the common junction of said filaments for varying the filament potentials of said rectifiers in opposite senses, thereby to equalize the cathode emissions of said rectifiers.

2. In a discriminator circuit of the type having a pair of electron discharge devices adapted to provide equal voltages across a pair of load impedances in response to input signals of a predetermined phase relationship, and wherein said electron discharge devices each includes a filament, means for balancing the zero signal output of said discriminator circuit, comprising a unidirectional potential source of filament voltage, a potentiometer connected across said source and provided with an adjustable arm, means connecting the filaments of said devices in series across said source, and a connection from the common junction of said filaments to the arm of said potentiometer, said potentiometer having a substantial shunting effect on said filaments, whereby the cathode emission of said devices may be varied by adjusting the arm of said potentiometer to provide equal zero signal output voltages across said load impedances.

3. In a discriminator circuit of a type having a pair of electron discharge devices arranged normally to provide symmetrical voltages across a pair of load impedances in response to a pair of input signals of a predetermined phase relationship and wherein said electron discharge devices each includes a filament, means for balancing the zero signal output of said discriminator, comprising a unidirectional potential source of filament voltage, means connecting the zero signal filaments of said devices in series across said source, a potentiometer connected across said series connected filaments and having a substantial shunting effect thereon, said potentiometer being provided with an arm, and means including a connection from the arm of said potentiometer to the common junction of said filaments for varying the filament voltages of said devices in opposite directions thereby to equalize the zero signal cathode emissions of said devices.

JAMES E. HAWKINS.
ROBERT S. FINN.

References Cited in the file of this patent

UNITED STATES PATENTS

| Number | Name | Date |
| --- | --- | --- |
| 1,696,025 | Atherton | Dec. 18, 1928 |
| 2,119,682 | Morrison | June 7, 1938 |
| 2,340,432 | Schock | Feb. 1, 1944 |